J. CROWLEY.
Thrashing-Machines.
No. 141,428.    Patented August 5, 1873.
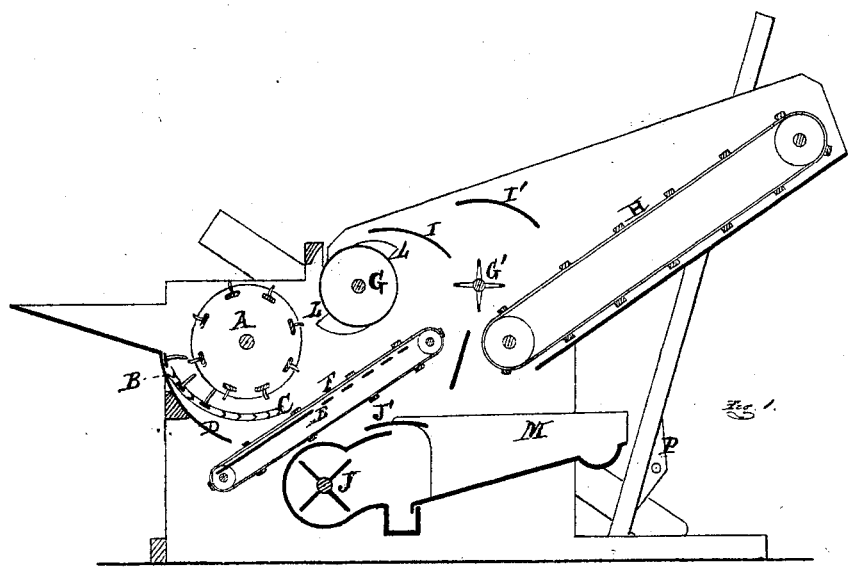
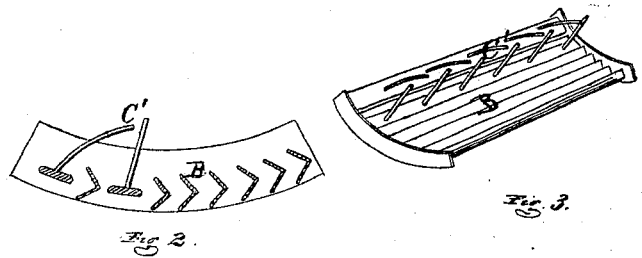
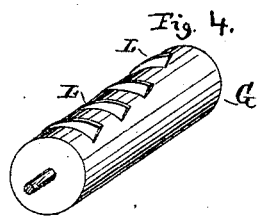

UNITED STATES PATENT OFFICE.

JOHN CROWLEY, OF SPARTA, WISCONSIN, ASSIGNOR OF ONE-HALF HIS RIGHT TO WM. C. LEYBURN, OF SAME PLACE.

IMPROVEMENT IN THRASHING-MACHINES.

Specification forming part of Letters Patent No. 141,428, dated August 5, 1873; application filed October 21, 1872.

*To all whom it may concern:*

Be it known that I, JOHN CROWLEY, of Sparta, in the county of Monroe and State of Wisconsin, have invented a new and useful Improvement in Thrashers and Separators; and I do declare that the following is a true and accurate description thereof, reference being had to the accompanying drawings, and to the letters of reference marked thereon, and being a part of this specification, in which—

Figure 1 is a vertical longitudinal section. Fig. 2 is a cross-section of the concave, showing the concave slats and grate. Fig. 3 is a perspective of the same. Fig. 4 represents a perspective view of the drum.

Like letters refer to like parts in each figure.

The nature of this invention relates to an improvement in thrashers and separators, so arranged as to effect a more perfect separation of the straw and grain at the cylinder. The invention consists more particularly in the construction of the concave, which is formed of peculiarly-shaped concave slats, making a grate with peculiarly-arranged teeth, which will catch the grain immediately from the cylinder and pass it to the rake underneath, and at the same time allow the straw to pass over it; also in the peculiar combination of the various parts, as more fully hereinafter described.

In the accompanying drawings, A represents the thrashing-cylinder; B C, the concave and grate; F, the short rake, and E a perforated floor within it; D, the conveying-board; G, a cylindrical drum; G', a picker-reel. I I', are hanging aprons; H, an open rake; J, the fan; and L, diagonal flanges on the drum G'. The slats or grates B of the concave C are curved or angular in cross-section, the concavity being presented toward the feeder. The teeth C' are in two series. The first series project from a flat bar in front of the first slat B; are curved and inclined toward the rear of the concave. The second series of teeth is secured in a similar bar between the first and second slats, projecting upward toward the axis of the cylinder. These teeth are straight, and are set alternating with or "dodging" to the first series, as seen in Figs. 2 and 3. The straw being dragged over the first series of teeth and between those of the second series in the rotation of the cylinder, the grain is quickly separated from the straw and passes down between the angular grates B of the concave to the rake F, while the straw passes over the concave. The slats in the concave and grate are concave or angular, as shown, one flange of the angle stopping the grain and the other preventing the straw from going through, allowing the straw to pass over, while the grain will pass through, the two combined forming a perfect open-slatted grate and concave from front to rear, thereby effecting a more perfect separation of the grain from the straw at the cylinder.

The grain passes through said concave and grate to the conveying-board D and floor E, and is carried thence on said floor to the shoe M by the rake F. This floor is perforated above the heel of the shoe to allow the grain to pass immediately to the shoe.

G is a cylindrical drum, provided at suitable intervals with a series of triangular flanges diagonally arranged upon the drum, as shown in Fig. 4, the office of the drum being to prevent the grain and straw flying from the cylinder and concave, and, by means of the diagonal flanges L, to work the straw back and forth transversely as it passes to the picker-reel G' and under it. This reel catches the straw and whips it upward and over against the hanging apron I'. The reel is open, with slats either made fast to the arms or mounted in slots, as may be preferred. The hanging apron I is to confine the straw to the rake F and picker-reel G'. I is a semi-circular or concave-jointed hanging apron to confine the straw to the picker-reel and the open agitating-rake H. J' is a dividing-board to convey what grain may be carried over the perforated floor E to the shoe M.

The great advantage I claim in this invention is a more thorough and immediate separation of the grain at the cylinder by means of the new concave and grate, as above described, and by means of the new drum G, combined with the picker-reel G', rakes F H, with the perforated floor, and conveying and dividing boards, to make perfect the separation without any waste of the grain whatever.

What I claim as my invention, and desire to secure by Letters Patent, is—

1. In thrashers and separators, the concave and grate, formed of concave or angular slats B, substantially as and for the purposes set forth.

2. In combination with said concave, the peculiar arrangement of the teeth C', as shown, and for the purposes set forth.

3. The drum G, provided with flanges L, for the purposes described.

4. In combination with said drum G, the picker-reel G', rakes F H, and perforated floor E, arranged to operate substantially as and for the purposes specified.

5. The described thrasher and separator, wherein the cylinder A, concave C, conveying-board D, perforated floor E, rakes F H, drum G, picker-reel G', hanging aprons I I', and fan J, are combined and arranged to operate substantially as and for the purposes set forth, shown, and described.

JOHN CROWLEY.

Witnesses:
J. E. SNOW,
L. POOLE.